(12) United States Patent
Blaszynski et al.

(10) Patent No.: US 7,547,028 B1
(45) Date of Patent: Jun. 16, 2009

(54) TIE ROD STEERING LINKAGE

(75) Inventors: Brian Blaszynski, St. Catharines (CA); Matthew Scott, St. Catharines (CA)

(73) Assignee: TRW Automotive U.S. LLC, Livonia, MI (US)

( * ) Notice: Subject to any disclaimer, the term of this patent is extended or adjusted under 35 U.S.C. 154(b) by 192 days.

(21) Appl. No.: 11/650,644

(22) Filed: Jan. 8, 2007

(51) Int. Cl.
*B62D 7/16* (2006.01)

(52) U.S. Cl. .......................... 280/93.51; 403/2; 403/14; 403/46; 403/290; 280/89.12; 280/89.13

(58) Field of Classification Search ............... 280/89.12, 280/89.13, 95, 95.1, 93.51; 403/2, 14, 46, 403/290
See application file for complete search history.

(56) References Cited

U.S. PATENT DOCUMENTS

| | | | |
|---|---|---|---|
| 2,175,429 A | | 10/1939 | Chayne |
| 2,757,028 A | | 7/1956 | Latzen |
| 3,938,822 A | | 2/1976 | Guerriero |
| 3,989,394 A | * | 11/1976 | Ellis ............... 403/46 |
| 4,614,451 A | | 9/1986 | Braisted, Jr. |
| 5,044,808 A | | 9/1991 | Busse |
| 5,104,136 A | | 4/1992 | Buhl et al. |
| 5,141,248 A | * | 8/1992 | Haldric et al. ............... 280/777 |
| 5,306,095 A | | 4/1994 | Snitgen et al. |
| 5,765,844 A | | 6/1998 | Wood |
| 6,038,771 A | * | 3/2000 | Takehara et al. ............ 29/897.2 |
| 6,074,125 A | * | 6/2000 | Krawczak ................ 403/374.3 |
| 6,086,075 A | | 7/2000 | O'Bryan et al. |
| 6,386,564 B1 | * | 5/2002 | Kincad et al. ............ 280/93.51 |
| 7,004,485 B2 | * | 2/2006 | Spagnuolo et al. ....... 280/93.51 |
| 7,182,544 B2 | * | 2/2007 | Irrer ............................. 403/43 |
| 7,201,530 B2 | * | 4/2007 | Wappes et al. ................ 403/27 |
| 7,416,198 B2 | * | 8/2008 | Blaszynski ............... 280/89.12 |
| 2007/0035117 A1 | * | 2/2007 | Green ........................ 280/775 |

* cited by examiner

*Primary Examiner*—John Q. Nguyen
*Assistant Examiner*—James English
(74) *Attorney, Agent, or Firm*—MacMillan, Sobanski & Todd, LLC

(57) ABSTRACT

A steering linkage assembly adapted to steer a pair of wheels of a motor vehicle, the motor vehicle steering linkage assembly comprising a first tie rod element having a first end operatively connected to a first wheel of the vehicle and a second end. A second tie rod element has a first end operatively connected to a second wheel of the vehicle and a second end. A tubular portion extends between the first and second tie rod elements, and has a first end that is operatively connected to the second end of the first tie rod element. A second end is operatively connected to the second end of the second tie rod element. The first end of the tubular portion defines a first end centerline and the second end of the tubular portion defines a second end centerline. The tubular portion includes a contoured section preferably adjacent to the tubular portion second end. The contoured section includes a section which defines a third centerline which is offset relative to the first and second centerlines and substantially parallel relative thereto.

20 Claims, 6 Drawing Sheets

TIE ROD STEERING LINKAGE

BACKGROUND OF THE INVENTION

This invention relates in general to a steering linkage for directing the coordinated movement of a motor vehicle's steerable wheels from driver inputs to the steering system. In particular, this invention relates to a tie rod steering linkage capable of clearing an interfering underbody obstruction.

Most motor vehicles use a pair of pivoting front wheels in order to direct the intended path of motion. These steering systems typically utilize connecting linkages with pivoting end points called tie rods. These devices are located underneath the vehicle and connect the front steering wheels in order to coordinate their movement in a substantially parallel manner. In operation, a driver turns a steering wheel inside the vehicle to effect desired directional changes. The steering inputs are transmitted from the steering wheel through a steering column and steering gear to a pitman arm which is pivotably connected to a drag link. The drag link is further pivotably connected to the right side spindle structure of a front wheel assembly in a left hand drive vehicle. A tie rod is the connecting link between the front steer wheels.

During operation, the steering inputs of the driver cause the tie rod assembly to move in a lateral and radial direction in order to actuate the steer wheels thus effecting a turn. The lateral and radial movement of the tie rod sweeps an area under the vehicle which must be unrestrained and unobstructed. For a given size of vehicle, the number of components required to be packaged underneath it creates issues because of limited available space. Rather than increase the available space under a vehicle, which increases both weight and cost, components have been modified to create clearances for steering linkage movement. Modifications to engine oil pans, structural cross members and the like have provided the needed clearances but create other problems and expense. For instance, an engine oil pan may be provided with a clearance in the center for steering linkage movement, but requires two drain plugs in order to adequately service the engine. This solution however adds expense and creates customer dissatisfaction. Furthermore, there is a limit to the number and extent that underbody components can be modified to provide sufficient clearance. It is thus desirable to create a steering linkage which can accommodate underbody obstructions without modification to these components and allow for unrestricted lateral and radial movement.

SUMMARY OF THE INVENTION

This invention relates to steering linkages adapted to steer a pair of wheels of a motor vehicle. More particularly, this invention relates to steering linkages having a tie rod end connected to each steer wheel and a tubular portion operatively connected therebetween. The tubular portion of the steering linkage has a first end defining a first centerline, a second end defining a second centerline, and a contoured section therebetween. The contoured section includes a section defining a third centerline which is offset relative to the first and second centerlines.

According to an alternative embodiment of this invention, a tubular linkage member of a vehicle steering linkage assembly is adapted to operatively connect a pair of tie rod elements. The tubular linkage member comprises first and second ends defining first and second centerlines respectively. A contoured section formed therebetween includes a third section defining a third centerline which is offset from the first and second centerlines and substantially parallel thereto. The tubular linkage member further may include a flared end preferably having a pair of opposed elongated slot structures formed therethrough.

According to yet another embodiment, a damper bracket is provided which includes a base plate, a mounting bolt connected thereto, and a plurality of clamping devices, preferably C-clamps, extending through mounting apertures formed therethrough. The damper bracket is fixedly connected to a section of the steering linkage and operatively connected to a steering damper device of the motor vehicle. Additionally, the C-clamps preferably engage a portion of the steering linkage circumference and are secured to the damper bracket by a sufficient number of retaining nuts.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
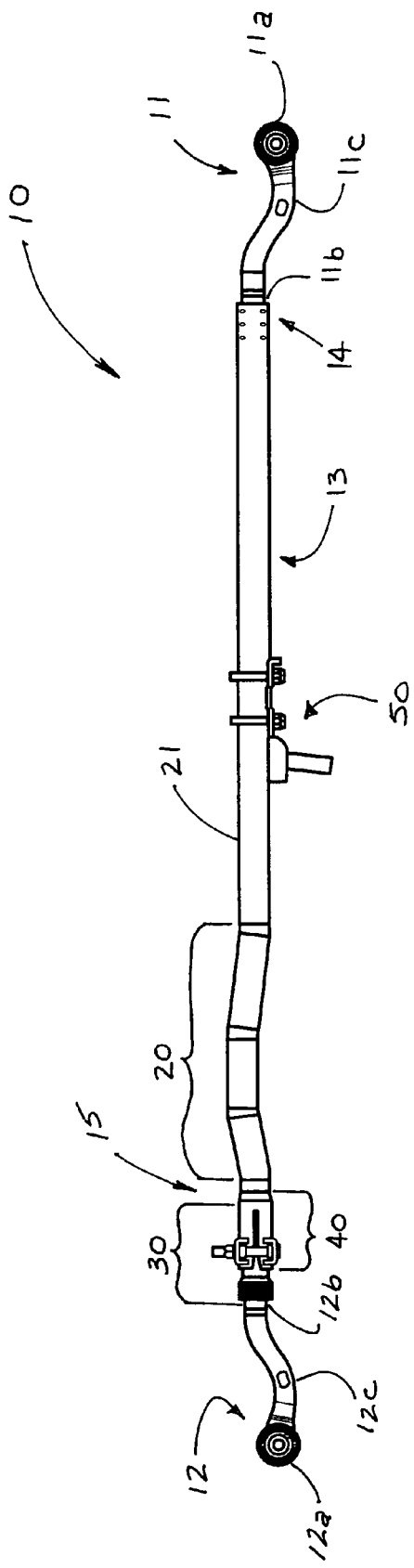
FIG. 1 is a plan view of an embodiment of a tie rod steering linkage.

Referring now to the drawings, there is illustrated in FIG. 1 an embodiment of a tie rod steering linkage for use in a motor vehicle, indicated generally at 10. The general structure and operation of the tie rod steering linkage 10 is conventional in the art. Thus, only those portions of the tie rod steering linkage 10 which are necessary for a full understanding of this invention will be explained and illustrated. Although this invention will be described and illustrated in connection with the particular kind tie rod steering linkage structure disclosed herein, it will be appreciated that this invention may be used in connection with other kinds of tie rod steering linkage structures if so desired.

The tie rod steering linkage 10 is connected between the front steer wheels (not shown) of the motor vehicle to transfer steering input motion received from one front wheel by other associated steering linkages (not shown) to the other front wheel. The tie rod steering linkage 10 further establishes and maintains the relative alignment of a forward most point of the front steer wheels in a vertical plane therebetween, commonly referred to as toe adjustment. The tie rod steering linkage 10 includes a pair of tie rod end elements 11 and 12 which engage spindle structures (not shown) operatively connected to the front steer wheels of the vehicle. In the illustrated embodiment, the tie rod elements 11 and 12 are preferably solid metallic structures. Alternatively, the tie rod elements 11 and 12 may be formed other than solid or metallic if so desired, such as for example, as a hollow tubular structure or a fibrous composite and resin structure.

In the illustrated embodiment, the tie rod elements 11 and 12 include first ends, 11a and 12a respectively. The first ends 11a and 12a may include a pivotable ball and socket tie rod end of the type described in U.S. Pat. No. 6,250,840 to Urbach et al., the description of which is incorporated herein by reference in entirety. Alternatively, other configurations of ball and socket structures may be used if so desired.

In the illustrated embodiment, the tie rod element 11 includes a second end 11b which is operatively connected to a proximal end, indicated generally at 14, of a substantially straight section 21 of tubular member 13, as part of the tie rod steering linkage 10. The tie rod element second end 11b is shown as preferably solid, however, it should be appreciated that the tie rod element second end 11b may be other than as illustrated, such as a hollow structure, if so desired. The second end 11b may be configured for threaded engagement with or may be configured for permanent attachment to the proximal end 14 of the substantially straight section 21 of the tubular member 13 if so desired. In the illustrated embodiment, the second end 11b of the tie rod end element 11 is preferably permanently connected to the proximal end 14 of tubular member 13 by staking. It will be appreciated that other suitable attachment processes for securing the second end 11b of the tie rod element 11 to the tubular member 13 may be used. For example, clamping, crimping, threading, bolting, riveting, welding, adhesively bonding and the like may be used if so desired.

In the illustrated embodiment, the tie rod element 12 is located at a distal end, indicated generally at 15, of tubular member 13. The tie rod element 12 includes a second end 12b which is preferably solid, however, it should be appreciated that the tie rod element second end 12b may be other than as illustrated, such as a hollow structure, if so desired. The second end 12b is preferably provided with external threads 12e, best shown in phantom in FIG. 3, and as will be discussed below the second end 12b is operatively threadably connected to an adjustment and clamping mechanism, indicated generally at 30. The adjustment and clamping mechanism 30 is also preferably threadably connected to a socket section 40 of the tubular member 13 at the distal end 15 thereof. It will be appreciated that other suitable attachment processes for securing the second end 12b of the tie rod element 12 to the adjustment and clamping mechanism 30 may be used. For example, mating splines and the like, or locking features, such as mating tapered wedges and the like may be used if so desired.

In the illustrated embodiment, the tie rod elements 11 and 12 preferably include a pair of arcuate sections 11c, 11d and 12c, 12d respectively, between the first ends 11a and 12a and the second ends 11b and 12b, respectively, thereof. The arcuate sections 11c and 11d and the arcuate sections 12c and 12d are each illustrated in this embodiment as being preferably a pair of coplanar arc sections but may be more or less in number and may oriented in any planar relationship to each other or to any appropriate datum as so desired. Alternatively, the construction of the tie rod elements 11 and/or 12 may be other than illustrated if so desired. For example, the tie rod elements 11 and/or 12 may be substantially straight if so desired.

In the illustrated embodiment, the tubular member 13 is preferably a hollow steel tube of substantially round cross section. Alternatively, the construction of the tubular element 13 may be other than illustrated if so desired. For example, the tubular element 13 may have any other suitable geometrical cross sectional shape, such as square, hexagonal, octagonal, and the like if so desired. Furthermore, the tubular member 13 may be formed from other suitable materials other than steel if so desired, such as but not limited to for example, aluminum, titanium, magnesium, and alloys thereof. The tubular member 13 further includes a unique contoured section, indicated generally at 20.

Figure 2A:
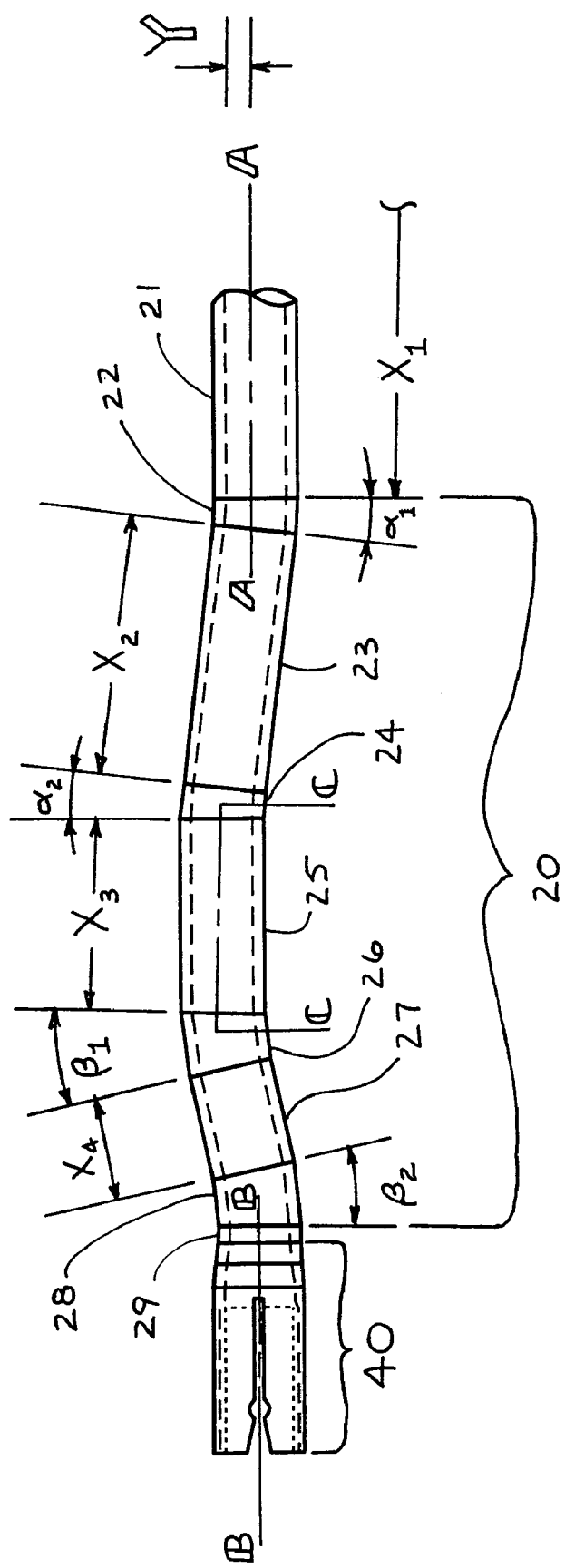
FIG. 2A is an enlarged plan view of a portion of the tie rod steering linkage illustrated in FIG. 1, showing the contour of a tubular section thereof.

The contoured section 20 of tubular member 13, best illustrated in detail in FIG. 2A as a preferred embodiment, comprises a plurality of arcuate sections interposed between a plurality of substantially straight sections of appropriate length. In the illustrated preferred embodiment, the contoured section 20 consists of four substantially arcuate sections 22, 24, 26, and 28 and three interposed, alternating substantially straight sections 23, 25, and 27. The four substantially arcuate sections 22, 24, 26, and 28, the three interposed substantially straight sections 23, 25, and 27 and substantially straight sections 21 and 29 are arranged to effect a clearance enabling feature as illustrated in FIG. 2A. These alternating substantially arcuate sections 22, 24, 26, and 28 and the substantially straight sections 21, 23, 25, 27, and 29 are operative to provide a clearance in tubular element 13 having sufficient free space between the contoured section 20 of tubular element 13 and adjacent components (not shown) of the vehicle, such as the engine oil pan, front axle housing, structural cross members and the like, to allow unrestricted lateral and radial movement of the tie rod assembly 10 when mounted in a vehicle. Though illustrated as oriented in a substantially coplanar relationship, the arcuate sections 22, 24, 26, and 28 and the straight sections 21, 23, 25, 27, and 29 may be oriented in any relationship as so desired to effect the intended clearance of the tubular element 13 with the adjacent components of the vehicle. In an alternative embodiment illustrated in FIG. 2B the contoured section 20 may be a substantially continuous arcuate section, of radius R, extending between substantially straight sections 21 and 29 if so desired.

Figure 2B:
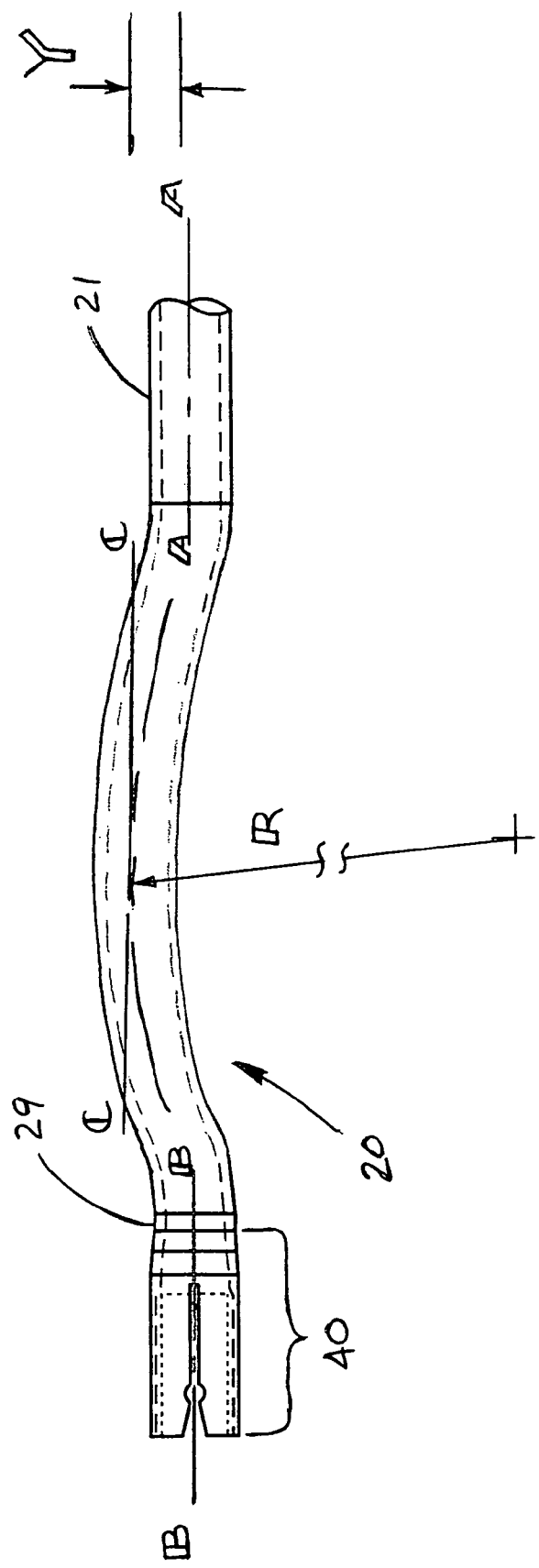
FIG. 2B is an enlarged plan view of a portion of the tie rod steering linkage illustrated in FIG. 1, showing an alternate embodiment of the contour of a tubular section thereof.

In the illustrated embodiment, the contoured section 20 terminates in the socket section 40, as part of the distal end 15 of the tubular member 13. Preferably, as shown in the illustrated embodiment, the centerline A-A of substantially straight section 21 is substantially collinear with a centerline B-B of socket section 40 in order to optimize the axial buckling strength of the assembled structure. As further illustrated in FIG. 2A, substantially straight section 25 may be at or near the center of contoured section 20 and represented by centerline C-C which is illustrated as substantially parallel to centerlines A-A and B-B if so desired. Alternatively, FIG. 2B depicts contoured section 20 as a substantially continuous arcuate section of radius R having a centerline C-C that is tangent thereto and substantially parallel to centerlines A-A and B-B, if so desired. The centerline C-C is illustrated in FIGS. 2A and 2B as having a lateral offset Y. Relative orientations of centerlines A-A, B-B, and C-C may be other than illustrated in FIGS. 2A and 2B if so desired and remain within the scope of this invention. It can be appreciated by one skilled in the art that the "axial buckling" characteristics of a tie rod assembly may be optimized by an orientation of the centerline A-A of the socket section 40 to centerline B-B of the substantially straight section 21 other than collinear, for example such as parallel or intersecting and the like, and still be within the scope of this invention.

The substantially arcuate sections 22, 24, 26, and 28 are illustrated in FIG. 2A as a preferred embodiment and defined with angular positional coordinates represented by $\alpha 1$, $\alpha 2$, $\beta 1$, and $\beta 2$, respectively. The arcuate sections may be formed in complimentary pairs having substantially similar angular values but of opposite sign or relative direction, if so desired. For example, in the illustrated embodiment, α1 and α2 are of similar angular values but of opposite sign or relative direction and β1 and β2 are of similar angular values but of opposite sign or relative direction. The arcuate sections may be such that the centerlines of select straight sections are maintained in a substantially parallel orientation. Other angular orientations, lateral offsets and/or linear displacements measured from the proximal end 14 of tubular member 13 or other appropriate datum point may be provided if so desired and remain within the scope of this invention.

The substantially straight sections 21, 23, 25, and 27 are illustrated in FIG. 2A as a preferred embodiment and defined with axial positional coordinates represented by X1, X2, X3, and X4 respectively. The first coordinate, X1, represents the approximate length of the substantially straight section 21 as measured axially from the proximal end 14 of the tubular member 13. Substantially straight section 21 may be the longest section, if so desired, but may be other than illustrated in order to effect a clearance function. The remaining substantially straight sections 23, 25, and 27 may be of decreasing lengths, as represented by X2, X3, and X4, if so desired. Thus, in the illustrated embodiment, X1 is greater than X2, X2 is greater than X3, and X3 is greater than X4. Other angular orientations, lateral offsets and/or linear displacements measured from the proximal end 14 of tubular member 13 or other appropriate datum point may be provided if so desired and remain within the scope of this invention.

Figure 3:
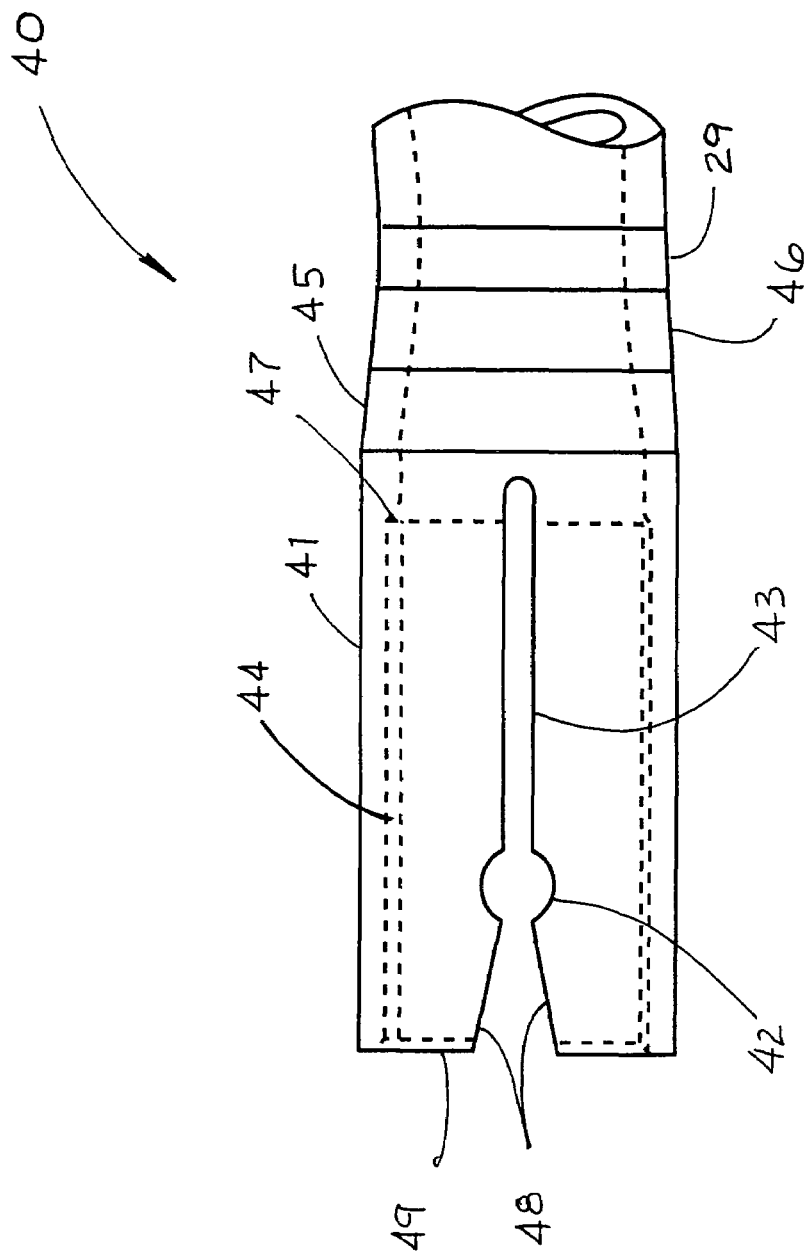
FIG. 3 is another enlarged view of a portion of the tie rod steering linkage illustrated in FIG. 1, showing an end of the tubular section thereof.

FIG. 3 illustrates a preferred embodiment of the socket section, indicated generally at 40. The socket section 40 includes a tapered section 46 and a flared transition section 45 terminating in the flared section 41. The flared section 41 includes a threaded inner surface, shown in phantom at 44, a thread runout section, shown in phantom at 47, and an opened end 49. The flared section 41 further includes a pair of opposed elongated openings including slots 43, pinch holes 42, and flared sections 48 formed therein and oriented approximately 180 degrees apart. In the illustrated embodiment, the slots 43 extend from a plane just beyond the threaded runout section 47 to pinch holes 42. The tapered slots 48 extend from the pinch holes 42 to the open end 49 of the flared section 41. The slots 43, pinch holes 42, and tapered slots 48 create an upper and lower half for a substantial length of the flared section 41. The pinch holes 42 facilitate compression of the taper slots 48 around the double-threaded sleeve 34, shown in FIG. 3, with reduced effort and lower circumferential distortion.

The flared section 41, flared transition section 45, and tapered section 46 are formed by expanding a region approximately equal in length to the flared section 41, flared transition section 45, and tapered section 46 of the substantially straight section 29, shown in FIG. 3 at its shortened, post-expansion length. Expansion of substantially straight section 29 is preferably performed by an expanding arbor (not shown) which is inserted into the open end 49 of substantially straight section 29. Other forming techniques well known in the art, such as spinning, hydroforming, magnetic pulse forming and the like, may be used to create flared section 41, flared transition section 45, and tapered section 46 and remain within the scope of this invention.

Figure 4:
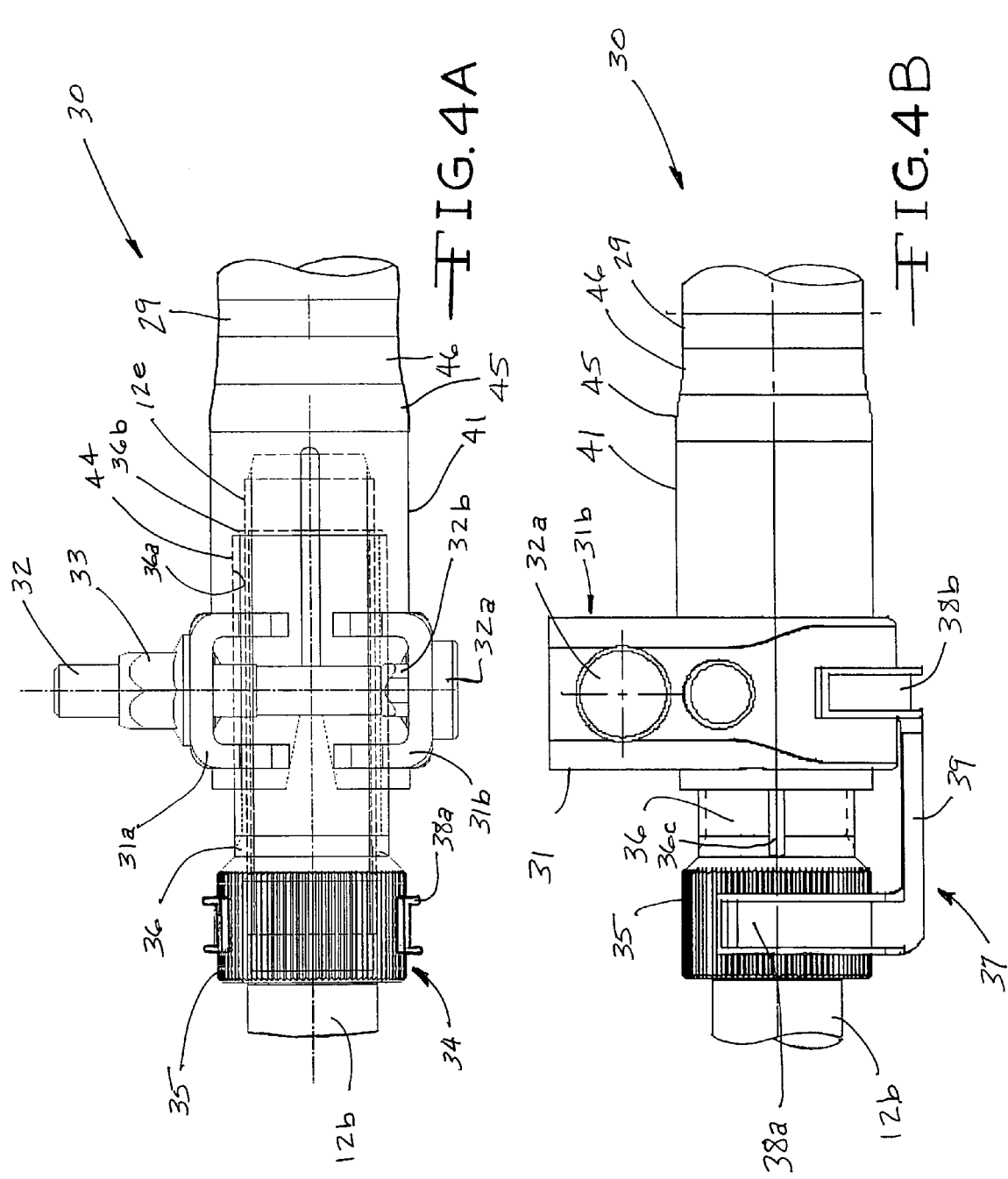
FIG. 4A is another enlarged plan view of a portion of the tie rod steering linkage illustrated in FIG. 1, showing the adjustment and locking structures thereof.
FIG. 4B is an enlarged side view of the adjustment and locking structure of FIG. 4A.

FIGS. 4A and 4B illustrate a preferred embodiment of the double-threaded, length adjustment feature and clamping mechanism, shown generally at 30. In the illustrated preferred embodiment, the second end 12b of the tie rod end element 12 is preferably provided with external threads 12e. The second end 12b of the tie rod element 12 is threaded into and forms an inner part of the double-threaded, length adjustment feature and clamping mechanism 30. The length adjustment feature 30 further includes a double-threaded sleeve, shown generally at 34, having a knurled end 35 and a sleeve end 36. The sleeve end 36 has external threads 36a and internal threads 36b which may be of opposite thread hand orientation and a slot 36c extending the length of sleeve end 36. The external threads 12e of the second end 12b of the tie rod end element 12 engage the internal threads 36b of the double-threaded sleeve 36. The external threads 36a of sleeve end 36 engage internal threads 44 of flared section 41, of which the internal threads 44 are best shown in FIG. 3. The opposite thread-hand orientation of the threads 36a and 36b allows for axial lengthening and foreshortening of the distance between of the first ends 11a and 12a of tie rod ends 11 and 12 respectively while maintaining the relative orientations of first ends 11a and 12a respectively when the double-threaded sleeve 34 is rotated relative to flared section 40 and tie rod second end 12b.

A position retaining clip, shown generally at 37 includes a first locating end 38a, a second locating end 38b, and a tie bar region 39 therebetween. The clip 37 provides a locking function between the double-threaded adjusting sleeve 34 and the clamp 31 to prevent inadvertent movement of the sleeve 34 prior to securing the clamp 31. The knurled end 35 engages a mating knurled inner surface (not shown) of the first locating end 38a. The second locating end 38b is fixedly attached to the clamp body 31. The first and second locating ends 38a and 38b are connected by the tie bar 39. In the illustrated preferred embodiment position retaining clip 37 is formed as a unitary structure however it may be formed from a plurality of individual components if so desired.

FIGS. 4A and 4B further illustrate the clamp body 31, a clamp bolt 32, and a retaining nut 33 which form the clamping mechanism and final position retention portion of the double-threaded, length adjustment feature and clamping mechanism 30. The clamp body 31 is preferably configured in a general "C" shape defining an opening 35 which is disposed about and engages an outer surface of the flared section 41. The clamp body 31 further has two opposed flanges 31a and 31b extending tangentially from the engaged flared section 41. Each opposed flange 31a and 31b has an aperture formed therethrough to receive a clamp bolt 32. The clamp bolt 32 extends through said apertures of both flanges, tangential to flared section 41 and engages a retaining nut 33. The clamp bolt 32 further includes an enlarged end 32a which engages flange 31b. The clamp bolt 32 is further illustrated as having a preferably torque resistive shank profile 32b abutting the enlarged end 32a which engages a correspondingly shaped hole in flange 31b to prevent rotational movement of the bolt 32 without the assistance of a wrench (not shown) when retaining nut 33 is tightened. Shank profile 32b is shown as having a hexagonal profile, though other torque resistive profiles such as square, octagonal, serrated and the like may be used if so desired. Furthermore, a bolt of conventional structure with a round shank and hexagonal head may also be used if so desired and remain within the scope of the present invention. Arrangements of the above described clamping components may be other than as depicted, if so desired, and still remain within the scope of the present invention. Alternative clamping structures, such as u-bolts and the like, are well known in the art and may be used if so desired and remain within the scope of this invention.

The desired orientation of first ends 11a and 12a of tie rods 11 and 12 respectively are obtained by rotating tie rod 11 relative to tie rod 12. Once the proper orientation of the respective tie rod ends 11 and 12 is achieved, the proper length therebetween may be adjusted by rotating knurled end 35 relative to flared section 40 and tie rod second end 12b.

Once the desired orientation and length are achieved, the clamp body 32 and position retaining clip 37 are slid into an engaged position over flared sections 41 and knurled end 35 respectively. As the retaining nut 33 is tightened onto the clamp bolt 32 the flanges 31a and 31b of the clamp body 31 are drawn together and constrict around the flared section 41 deflecting the slot 43, pinch hole 42, and taper slot 48. The clamp body 31 compresses the flared section 41 into a fixed engagement with the double-threaded sleeve 36 and sleeve slot 36 and the assembled threaded second end of tie rod end 12 thereby fixing the length and orientation of the tie rod assembly. Other length adjustment mechanisms known in the art, such as described in U.S. Pat. No. 5,286,133 to Wood, the disclosure of this patent incorporated herein by reference in entirety, may be used if so desired. To readjust the length of tie rod assembly 10, the steps above are performed in reverse order.

Figure 5:
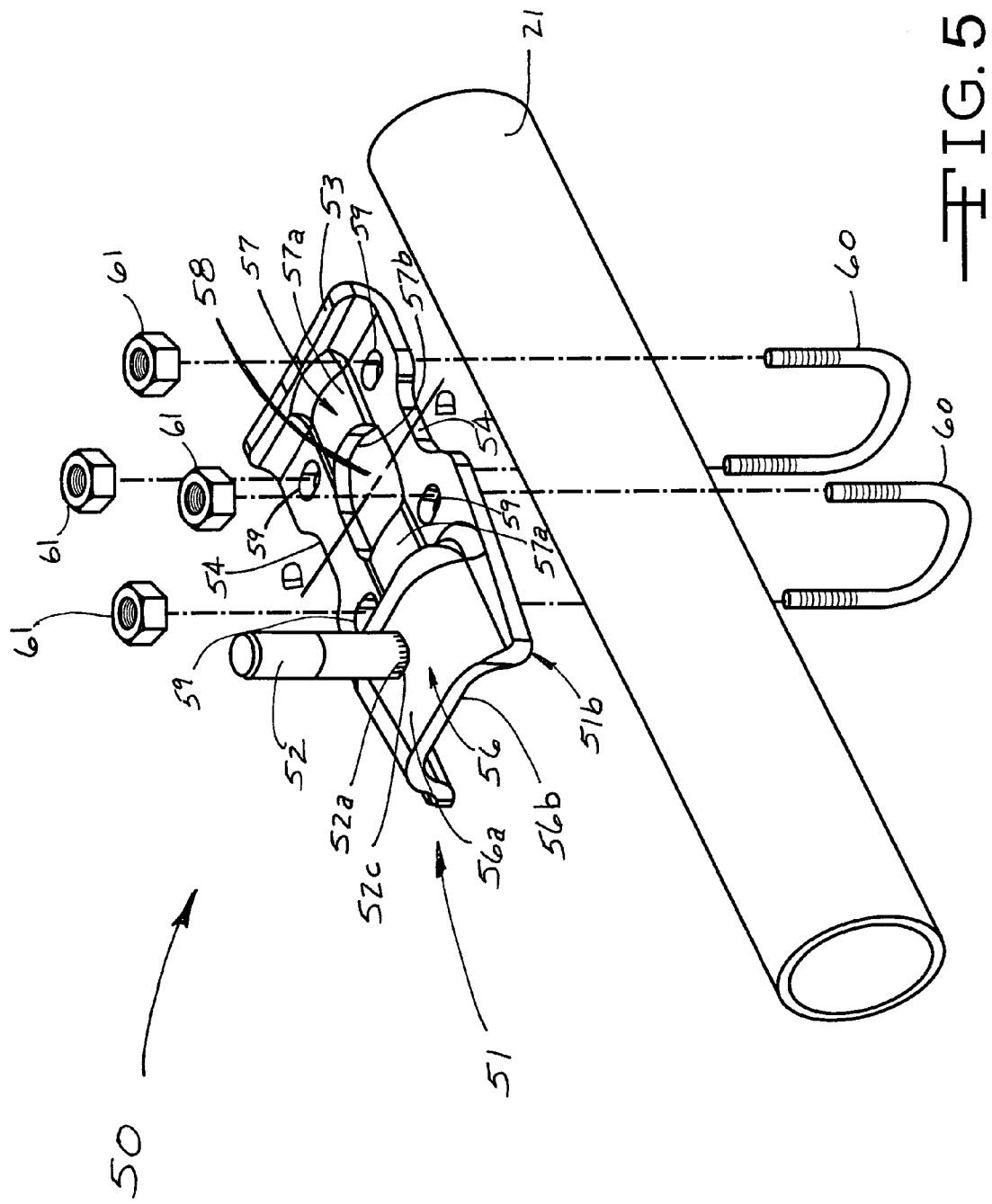
FIG. 5 is an exploded perspective view of a portion of the tie rod steering linkage illustrated in FIG. 1, showing a damper bracket structure thereof.

In the illustrated embodiment of FIG. 1, the tie rod steering linkage 10 further includes a damper attachment bracket assembly, indicated generally at 50. The damper bracket assembly 50 is operative to connect a steering damper mechanism (not shown) to the tubular element 13 of the tie rod steering linkage 10. As best shown in FIG. 5, in the illustrated embodiment the damper attachment bracket assembly 50 includes a base plate 51, having a non-uniform first side 51a and a non-uniform second side 51b. The base plate 51 further includes a raised stem pad 56 having a first surface 56a and a second surface 56b, and a stem mounting hole 56c formed therethrough which receives a mounting stem 52. The second surface 56b of raised stem pad 56 is located in a plane sufficiently distant from the surface of straight section 21 to provide clearance of the enlarged stem head region of mounting stem 52 to the straight section 21. The mounting stem 52 is preferably provided with a knurled or serrated region 52a which engages the stem mounting hole 56c in an interference fit relationship and an enlarged head region (not shown) which locates against the second surface 56b. Though the mounting stem 52 is illustrated as having a knurled or serrated region 52a, a smooth surface may be provided if so desired, and retained to base plate 51 using an interference fit as described above. Other processes may be used to connect mounting stem 52 to base plate 51, such as welding, adhesive bonding, bolting, screwing, upset riveting, and the like and remain within the scope of this invention. Further, mounting stem 52 may alternatively be provided as a threaded bolt of conventional construction and engaged in stem mounting hole 56c by mating threads formed therein.

The base plate 51 has a raised end flange 53 projecting upwardly from first surface 51a and away from straight section 21. Both raised end flange 53 and the raised stem pad 56 provide increased bending stiffness in a plane parallel with second surface 51b and circumferentially about the axial centerline of substantially straight section 21. The base plate 51 further has at least one recessed section 54, and preferably a pair of opposed recessed sections 54, to decrease the bending stiffness of the base plate 51 in a plane parallel with second surface 51b and in a bending mode along an axis D-D substantially perpendicular to substantially straight section 21. Recessed sections 54, along with center hole 58, provide a bending stiffness of the bracket which does not substantially alter the overall bending stiffness of the tie rod assembly 10. Recessed sections 54 and center hole 58 are illustrated as a preferred embodiment and may be configured or oriented in another manner if so desired to optimize the structural stiffness of the tie rod assembly 10 and remain within the scope of this invention.

The base plate 51 further has a plurality of locating contours 57, each having first surfaces 57a and second surfaces 57b. Though illustrated as having preferably two locating contours 57, the base plate 51 may have more or fewer locating contours 57 if so desired. The second surfaces 57b of contours 57 locate on the outer circumferential surface of the straight section 21 of tubular member 13 to provide a substantially tangential orientation of the base plate 51 to the surface of the straight section 21. As illustrated in the preferred embodiment of FIG. 5, the base plate 51 is secured to straight section 21 of tubular member 13 by a pair of u-bolts 60 and retaining nuts 61. The u-bolts 60 engage an outer circumferential surface of substantially straight section 21, extend through the mounting holes 59, and thread into retaining nuts 61 to secure the base plate 51 to straight section 21. Attachment hardware other than u-bolts, such as straps and bolts, and in numbers more or less than as illustrated in the preferred embodiment may be used if so desired. In an alternative embodiment, base plate 51 may be permanently fixed to straight section 21 by welding, adhesive bonding and the like if so desired. The damper assembly, connected at one end to mounting stem 52 and the other end to a suitable fixed point on the vehicle structure (not shown), reacts to velocity inputs of the tie rod structure, in the manner of a shock absorber, to isolate resulting objectionable vibrations from transmission to the steering column and steering wheel.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A steering linkage assembly adapted to steer a pair of wheels of a motor vehicle, the motor vehicle steering linkage assembly comprising:
   a first tie rod element having a first end operatively connected to a first wheel of the vehicle and a second end;
   a second tie rod element having a first end operatively connected to a second wheel of the vehicle and a second end; and
   a tubular portion extending between said first and second tie rod elements, said tubular portion having a first end section having a first end operatively connected to said second end of said first tie rod element and a second socket end section having a second end operatively connected to said second end of said second tie rod element, said first end section of said tubular portion defining a first outer diameter and a first end centerline and said second end of said second socket end section of said tubular portion defining a second outer diameter and a second end centerline;
   wherein said tubular portion includes a contoured section that is an intermediate section between said first end section and said second socket end section, said contoured section having a third outer diameter that is substantially the same as said first outer diameter and smaller than said second outer diameter and further including a section defining a third centerline which is offset relative to said first and second centerlines and parallel relative thereto.

2. The motor vehicle steering linkage assembly of claim 1 wherein said contoured section includes at least a pair of arcuate sections and a substantially straight section disposed between said arcuate sections.

3. The motor vehicle steering linkage assembly of claim 1 wherein said contoured section includes four arcuate sections and three substantially straight sections, a respective one of said three substantially straight sections disposed between a successive pair of said four arcuate sections; and wherein said first centerline is substantially co-linear with said second centerline.

4. The motor vehicle steering linkage of claim 1 wherein said second end of said tie rod element is provided with external threads and said second end of said tubular portion includes a flared section having internal threads which threadably engage with said external threads of said second end of said second tie rod element.

5. The motor vehicle steering linkage of claim 4 wherein an adjustment means is provided at the connection of said external threads of said second end of said second tie rod element and of said internal threads of said flared section of said tubular portion second end.

6. The motor vehicle steering linkage of claim 5 wherein said adjustment means includes a sleeve, said sleeve having both internal and external threads, wherein said external threads of said sleeve threadably engaged into said flared section internal threads.

7. The motor vehicle steering linkage of claim 6 wherein said adjustment means includes a clamping means and a locking clip, said locking clip fixedly engaging said adjustment sleeve, said locking clip further fixedly connected to said clamping means.

8. The motor vehicle steering linkage of claim 1 wherein a damper bracket is attached to said tubular portion, said damper bracket including a base plate and a damper mounting bolt, said damper mounting bolt adapted for mounting a damper device thereto.

9. The motor vehicle steering linkage of claim 8 wherein said damper bracket includes at least one clamping means engaging said base plate and connecting said tubular section thereto.

10. A hollow tubular linkage member adapted to operatively connect together a pair of tie rod elements of a vehicle steering linkage assembly, said hollow tubular linkage member comprising:

a first end section defining a first centerline and a first outer diameter and operatively connected to a first wheel of the vehicle;

a second end defining a second centerline and including a second socket end section, said second socket end section defining a second outer diameter and operatively connected to a second wheel of the vehicle; and a contoured section defining a third outer diameter that is substantially the same as said first outer diameter and smaller than said second outer diameter, said contoured section being an intermediate section between said first end section and said second socket end section and further including a section defining a third centerline which is offset relative to said first and second centerlines and substantially parallel thereto.

11. The tubular linkage member of claim 10 wherein said contoured section includes at least a pair of arcuate sections and a substantially straight section disposed between said arcuate sections.

12. The tubular linkage member of claim 10 wherein said contoured section includes four arcuate sections and three substantially straight sections, a respective one of said three substantially straight sections disposed between a successive pair of said four arcuate sections; and wherein said first centerline is substantially co-linear with said second centerline.

13. The tubular linkage member of claim 10 wherein said contoured section includes a substantially arcuate section, said substantially arcuate section having a point tangent to said third centerline.

14. The tubular linkage member of claim 10 wherein said second end includes a flared section having internal threads, said flared section further having at least one axially elongated opening formed therethrough, wherein said axially elongated opening includes an elongated region, an arcuate region, and a flared region.

15. The motor vehicle steering linkage of claim 1 wherein said tubular portion is a hollow tubular portion.

16. The motor vehicle steering linkage of claim 1 wherein said contoured section is a substantially continuous arcuate section extending between said first end section and said socket end section.

17. The motor vehicle steering linkage of claim 16 wherein said substantially continuous arcuate section includes a point that is tangent to said third centerline.

18. The motor vehicle steering linkage of claim 1 wherein said third diameter is larger than said first and second diameters.

19. The tubular linkage member of claim 10 wherein a damper bracket is attached to said first end section of said hollow tubular linkage member, said damper bracket including a base plate and a damper mounting bolt, said damper mounting bolt adapted for mounting a damper device thereto.

20. The tubular linkage member of claim 10 wherein said third diameter is larger than said first and second diameters.

\* \* \* \* \*